(No Model.) 6 Sheets—Sheet 2.

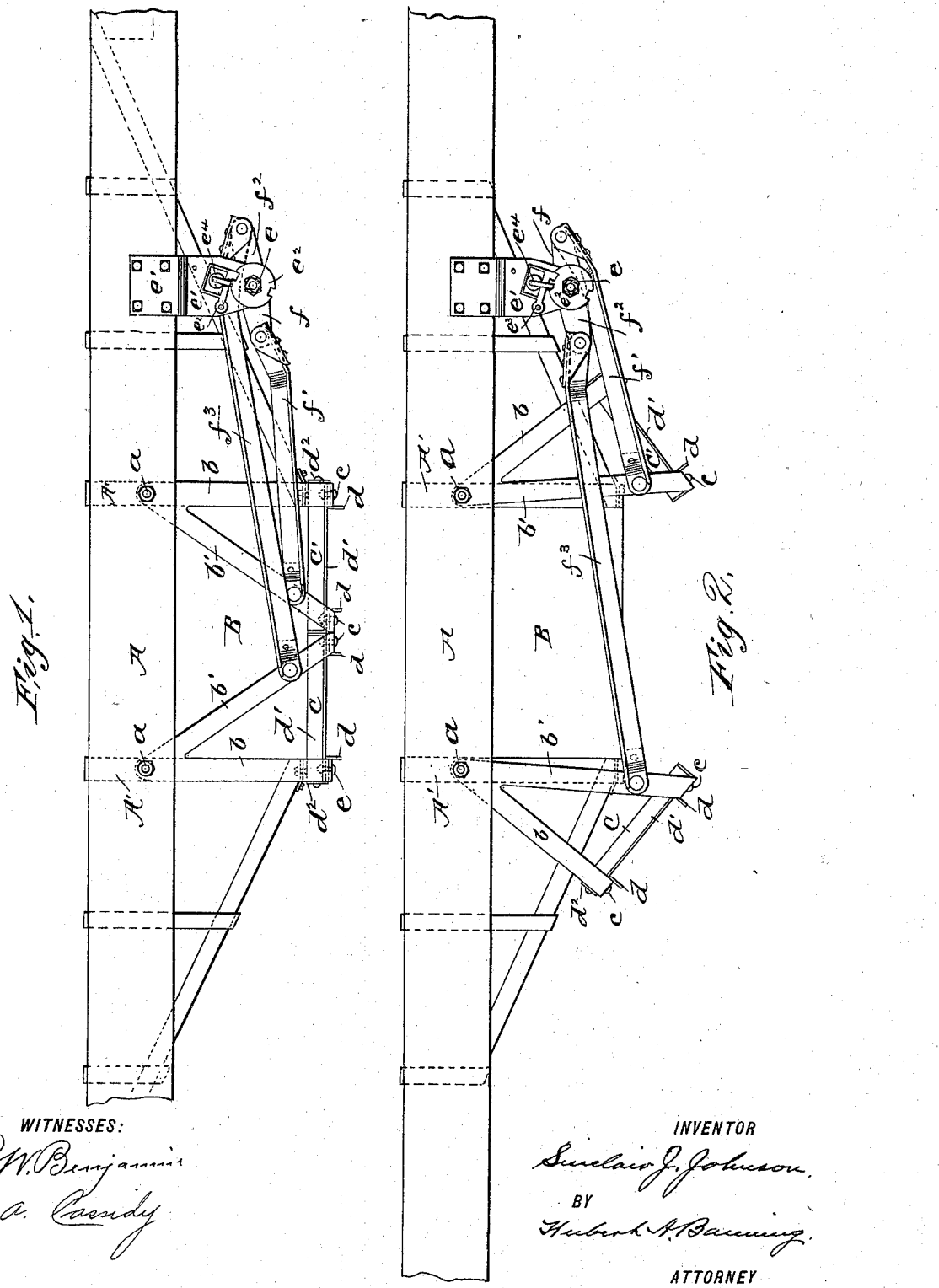

S. J. JOHNSON.
DUMPING CAR.

No. 571,480. Patented Nov. 17, 1896.

WITNESSES:
M. A. Cassidy
E. G. Wilkinson

INVENTOR
Sinclair J. Johnson,
BY
Hubert A. Banning
ATTORNEY.

(No Model.) 6 Sheets—Sheet 3.
S. J. JOHNSON.
DUMPING CAR.
No. 571,480. Patented Nov. 17, 1896.
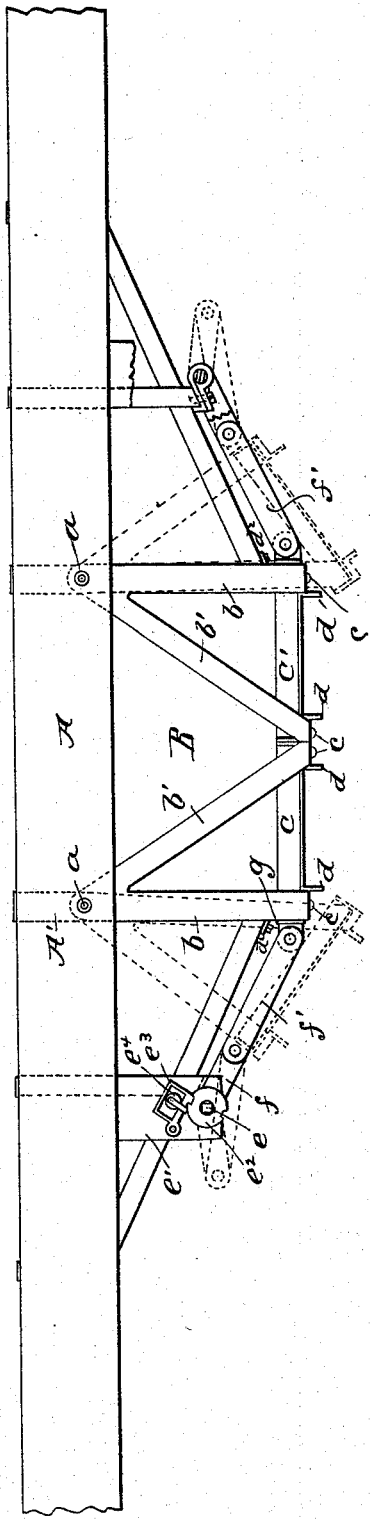
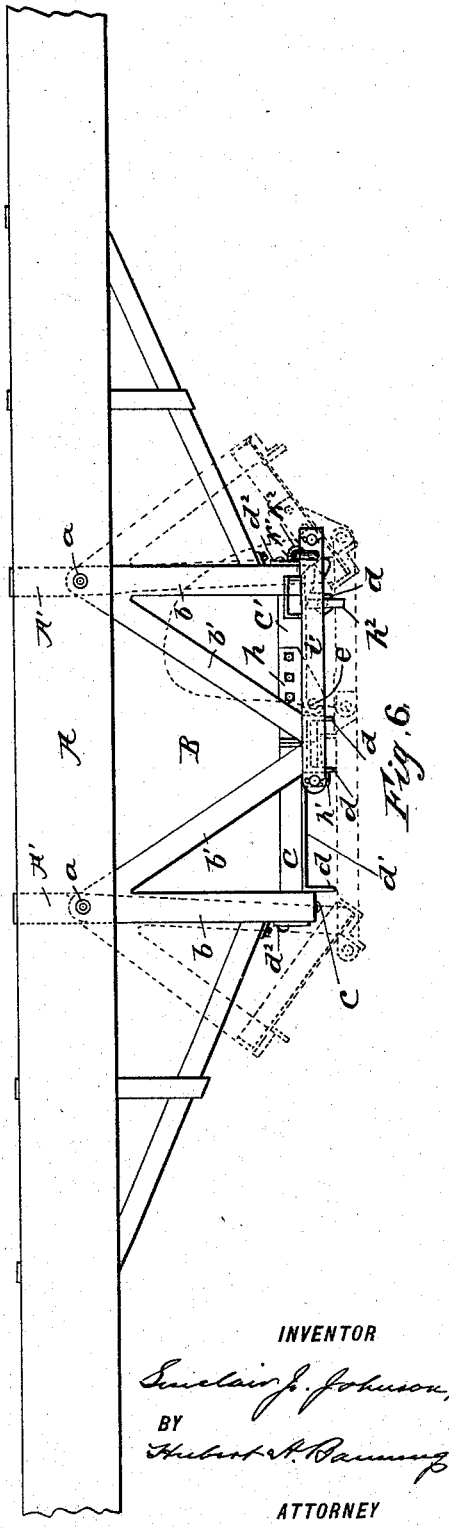
WITNESSES:
INVENTOR
ATTORNEY

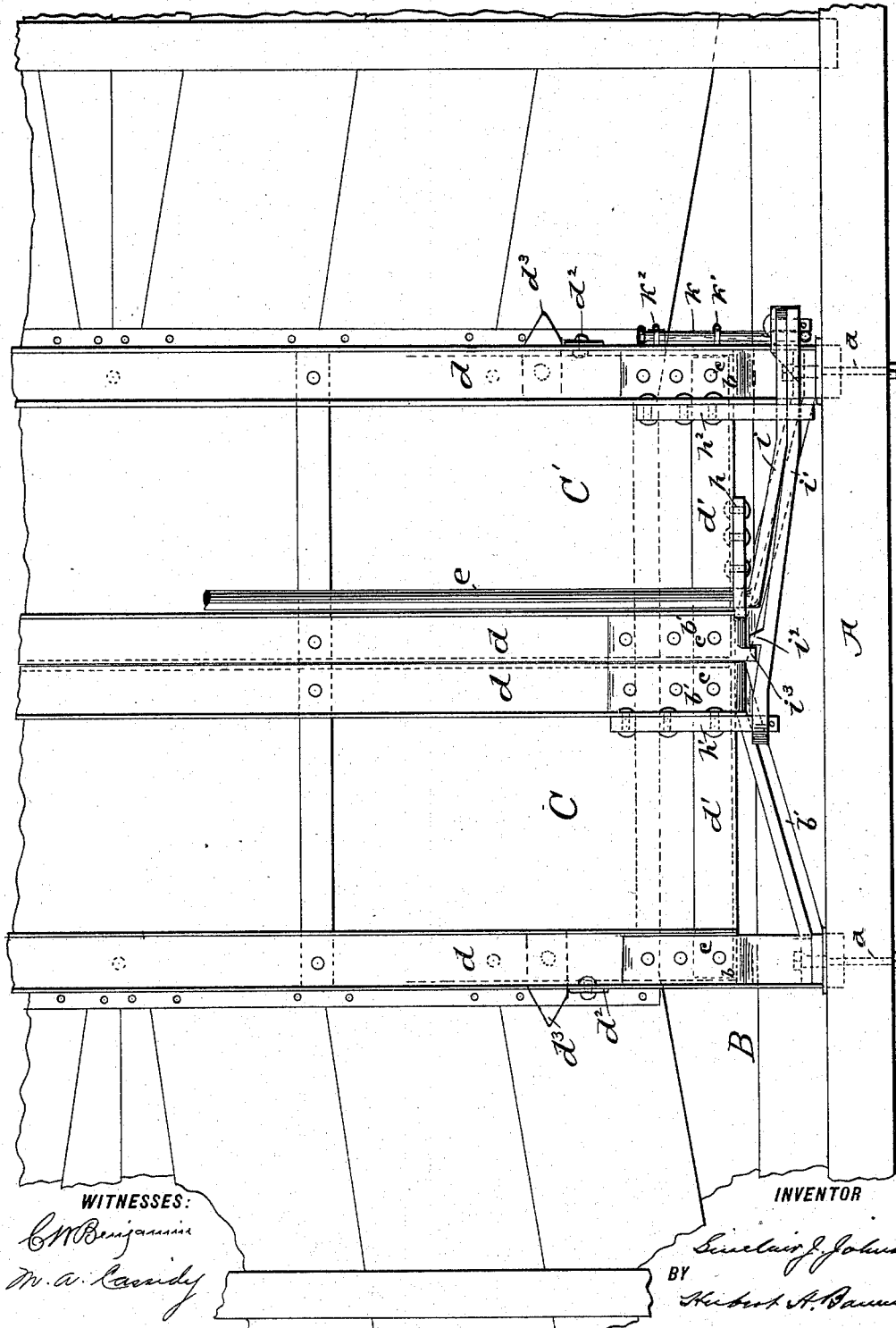

(No Model.)
S. J. JOHNSON.
DUMPING CAR.
No. 571,480.  Patented Nov. 17, 1896.
6 Sheets—Sheet 5.
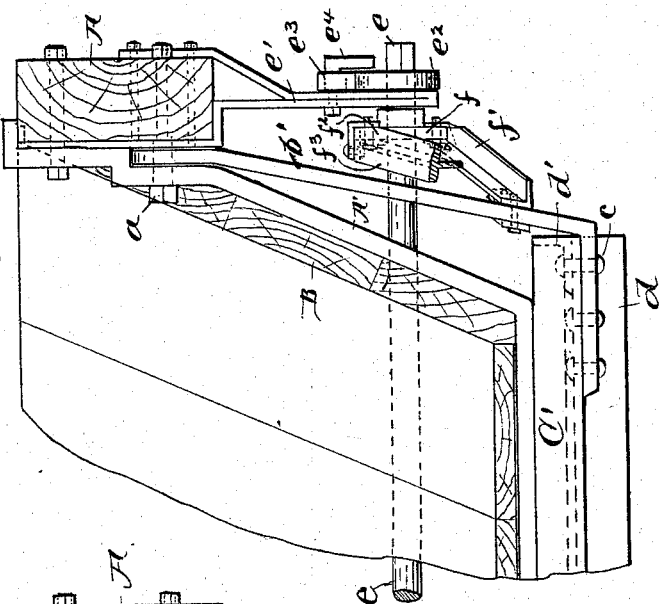
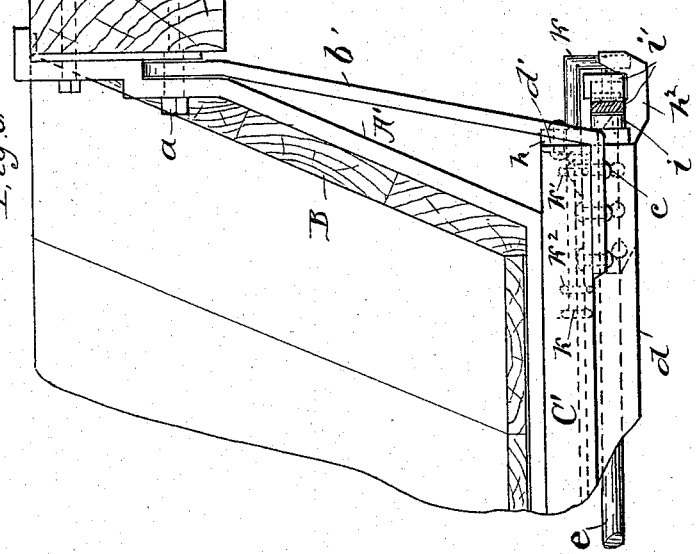
WITNESSES:
INVENTOR
ATTORNEY.

(No Model.)　　　　　　　　　　　　　　　　6 Sheets—Sheet 6.
S. J. JOHNSON.
DUMPING CAR.
No. 571,480.　　　　　　　　　Patented Nov. 17, 1896.
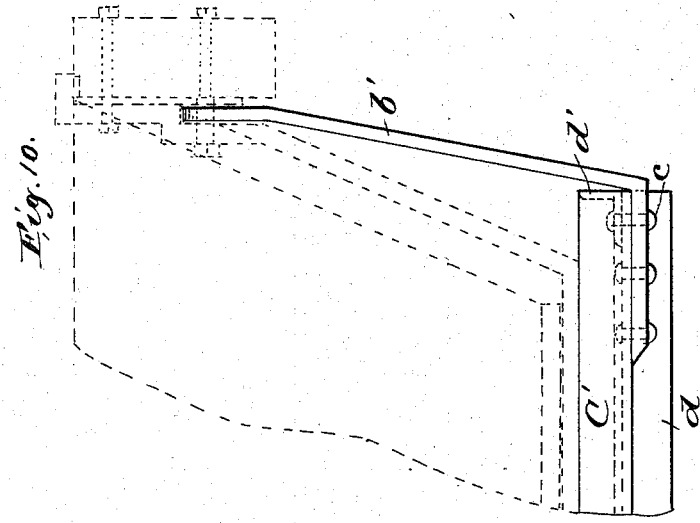
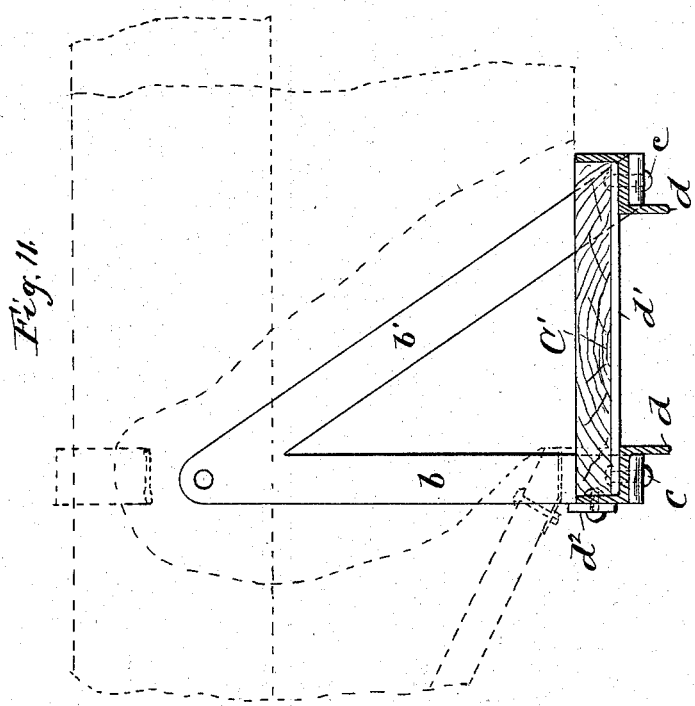
WITNESSES:　　　　　　　　　　　　　　　INVENTOR

UNITED STATES PATENT OFFICE.

SINCLAIR J. JOHNSON, OF NEW YORK, N. Y.

DUMPING-CAR.

SPECIFICATION forming part of Letters Patent No. 571,480, dated November 17, 1896.

Application filed February 24, 1896. Serial No. 580,556. (No model.)

*To all whom it may concern:*

Be it known that I, SINCLAIR J. JOHNSON, a citizen of the United States, and a resident of the city of New York, in the county and State of New York, have invented certain new and useful Improvements in Dumping-Cars, of which the following is such a full, clear, concise, and exact description as will enable others skilled in the art to which my invention appertains to make and use the same, reference being had to the accompanying drawings, forming part of this specification.

My invention relates to and is applicable for use upon hopper-bottom gondola cars and ore-cars, as well as some other styles of dumping-cars. It has for its objects the construction and hanging of the gate or gates which close the bottom of the hopper or part from which the load is dumped in such manner as to facilitate opening and closing and avoid the objections to hinged gates when open, as well as other objections which have heretofore been experienced.

To these ends the invention consists in combining with the car one or more oscillating gates, which are suspended from above in such manner as to vibrate or swing open and shut by bodily receding or advancing, and in providing means for opening and closing the same, as hereinafter more fully described, and pointed out in the claims.

Figure 3:
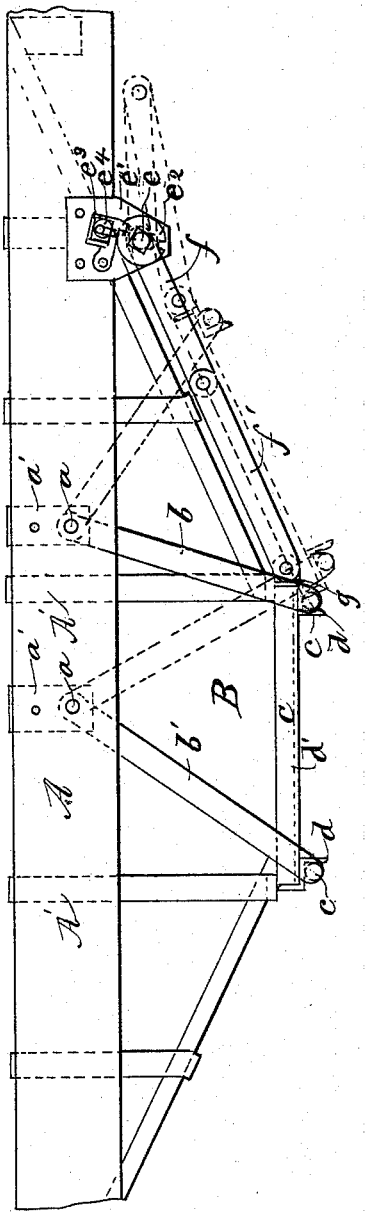
Figure 4:
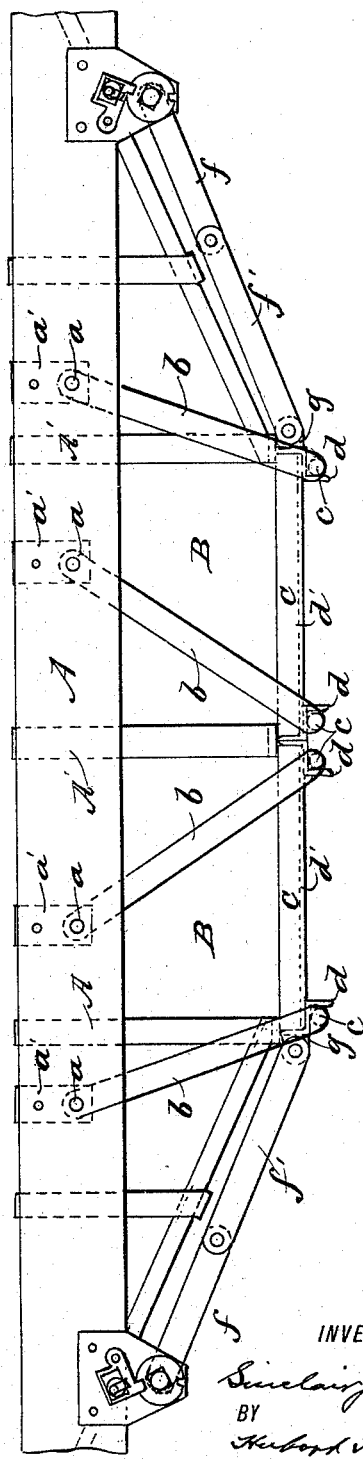

In the accompanying drawings, Figure 1 is a side view of the hopper of a hopper-bottom gondola car, showing one end of each of two gates, the hangers by which the same are suspended, and certain lever connections for opening and closing them, the gates being shown in this figure as closed. Fig. 2 is a similar view of the same parts, but showing the gates as open. Fig. 3 is a similar view showing the hopper closed at the bottom of one gate only, the gate being suspended by two straps, each of which is pivoted at each end so as to swing both from the points secured to the car and to the gates. In this figure the gate is shown as being operated by a modified form of the mechanism shown in Figs. 1 and 2, and its position when open is indicated by dotted lines. Fig. 4 is a similar view, but showing a divided or double hopper, each compartment of which is closed by a single gate suspended and provided with the same means for opening and closing as shown in Fig. 3. Fig. 5 is a similar view of a hopper having two gates suspended, as in Figs. 1 and 2, but provided with lever connections arranged to open and close the gates separately, as in Figs. 3 and 4, the position shown being that of the gates closed, and their position when open being indicated by dotted lines. Fig. 6 is a similar view of the same parts, but shows the lever connections as applied and secured upon the gates themselves, their position as shown being that when closed, and their position when open being indicated by dotted lines. Fig. 7 is a bottom plan of the gates and lever connections shown by Fig. 6. Fig. 8 is a sectional detail view of the inside of the hopper and one of the gates, with certain parts of the lever connections shown in Fig. 1. Fig. 9 is a similar sectional detail view of the gates and lever connections shown in Figs. 6 and 7. Figs. 10 and 11 are partial sectional detail views of the gates and hangers of Figs. 1, 2, 5, and 6, shown in front and end views.

The drawings illustrate two forms of application of the improvement in means for suspending the gates so as to secure the results aimed at, and that form which shows the gate suspended by hangers pivoted at their lower ends to the gate and at their upper ends to the hopper or some portion of the car is more specifically made the subject of an application filed by me July 25, 1896, Serial No. 600,480.

The drawings also show several forms of mechanism for opening and closing the gates, which are more specifically made the subject of applications filed by me on February 24, 1896, Serial No. 580,557, and a division of the same filed by me on July 25, 1896, Serial No. 600,479, as well as one other filed by me on February 24, 1896, Serial No. 580,558.

In the drawings, A represents the side sill of a hopper-bottom car, and B the hopper for the same. The gates C C' are shown as being made to close the bottom of the hopper, and when opened the coal or other load passes out beneath the car. The gates C C' are rigidly secured at their outer edge and at each end by bolts or pivots *c c* to hangers therefor, which are shown as metallic straps *b b*, having one arm longer than the other, pivoted at their upper ends by bolts $a\,a$ passing through the side sill A and also through the hopper-iron A' or side sill and plate $a'$. These straps $b\,b$ are shown in Figs. 1, 2, 5, 6, 8, 9, 10, and 11 as having one arm, $b'\,b'$ being the longer arms, extending downward at an angle from the pivot-bolts $a$, which is rigidly secured to the inner edge of the gate; and in Figs. 3 and 4 there are two straps for one gate, pivoted at both ends, the longer one supporting the front edge of the gate. As shown, the gates are either suspended from one arm of the hanger to which the outer edge thereof is secured, while the other and longer arm or strap of the hanger extends diagonally from the pivot to the inner edge of the gate and is secured thereto, forming a support for the same, or they are pivotally secured at each edge to straps $b\,b$, which are also pivoted at their upper ends.

The gates are shown as being eccentrically suspended from above the bottom of the hopper from a point or points which are off the center of the weight of the gate, and it will tend to spring partially open of itself when it is desired to dump the load and the gate is released from its fastenings. This eccentric suspension also has the advantage of permitting the gate to swing open or shut without having any portion of it pass very much below the bottom of the hopper, the gate simply moving bodily and its front edge dropping lower than the rear edge, while both edges change their relative position with respect to the exit for the load.

The gates are preferably made on a frame of Z-iron $d$ for the outer and inner edges and of angle-iron $d'$ for each end, firmly riveted or bolted together, which frame is floored with suitable plank. The purpose of using the Z-iron is to secure great stiffness and afford good connections for the attachments. At the rear of each end of the gate a flat piece of iron $d^2$ of sufficient strength is riveted on the Z-iron $d$ and extends up above the same, so as to catch against the hopper-iron A' when the gates are closed, and this iron $d^2$ also works against a guide $d^3$ to prevent lateral or other motion of the gates.

The gates being suspended from a point above the bottom of the hopper by two hangers or arms of unequal length, the larger one of which supports the front edge, will have an oscillating motion, so as to open and close by causing the front edge of the gate to drop and describe a greater arc than the rear edge, and when opening the outer edge will swing back and up, thus forming an incline to relieve the gate of accumulations adhering thereto prior to opening.

The gates are preferably opened and closed by means of certain lever connections, the movements of which will have the effect of swinging them on the pivots $a\,a$ in either direction desired. In Figs. 1, 2, and 8 this lever mechanism is shown as consisting of a shaft $e$, having one end square or otherwise adapted to receive a wrench for turning it. This shaft is supported by plate-brackets $e'$, which are secured to the side sill A by suitable bolts. On one end of the shaft $e$ a notched disk or wheel $e^2$ is secured outside of the supporting-bracket, the notches being adapted to receive a dog or pawl $e^3$, pivoted to the bracket and which acts as a locking device to prevent any turning of the shaft. The pawl $e^3$ is shown as being operated by an eccentric $e^4$, which is also secured to the bracket $e'$. On the shaft $e$ and inside of the plate-bracket $e'$ a double-armed crank or equivalent device is rigidly secured, and one arm, $f$, of this crank is pivotally secured to one end of a lever-bar $f'$, which has its opposite end pivotally secured to the gate hanger-strap $b'$ of the gate C'. The other arm, $f^2$, of the crank is also pivotally secured to one end of a lever-bar $f^3$, and the other end of this bar is likewise secured to the hanger-strap $b'$ of the gate C.

The gates being closed, as in Fig. 1, and a wrench being applied to the end of the shaft $e$, and the shaft being partially rotated, the crank-arms $f$ and $f^2$ will by this action change their positions and move the bars $f'$ and $f^3$, which in turn will push the hanger-straps $b$ and $b'$ so as to swing them on the pivots $a\,a$, thereby causing the gates C and C' to open and assume the position shown in Fig. 2. A reverse movement of the shaft $e$ will have the opposite effect and close the gates.

In Figs. 3, 4, and 5 the mechanism shown for opening and closing the gates is essentially the same, only that the shaft is used for each gate and is made to operate a single crank-arm, and the bar $f'$, instead of being secured to the hanger-strap $b'$, is secured to a lug $g$, projecting from the Z-iron $d$. The operation is precisely the same as in the gate C' of Fig. 1, each separate or single gate being operated by the use of a wrench in the same way.

In Figs. 6, 7, and 9 the lever mechanism is arranged to be operated by a shaft secured directly to one of the gates and made to swing with it. The shaft $e$ (shown in these figures) is secured to the under side of the gate C', just back of the Z-iron $d$, by means of a plate $h$, riveted or bolted to the angle-iron $d'$ of the frame of the gate. This shaft is secured at both ends in the same way and does not require a wrench in order to rotate it. In this form of the construction it is not necessary to have lever-bars connecting with the hanger-strap. Each end of the shaft $e$, or, if desired, a separate piece at each end, forms projections or bars $i$ along or near the ends of the gate and crosswise thereof, and these bars are pivoted at their outer ends to another similar bar $i'$, a knuckle-joint being preferably formed at such union. The other end of the bar $i'$ is also pivotally secured to the under side of the gate C by means of a plate $h'$, riveted or bolted to the back of the Z-iron $d$. The bar $i'$ is provided with a lug or catch $i^2$, which hooks over a projection $i^3$ made on the hanger-strap $b'$ of the gate C', so as to act as a secondary fastening for the purpose of holding the gates together. The bars $i$ and $i'$, by which the gates are coupled together, are prevented from swinging more than a short distance below the line of their dead-center, when the gates are closed, by means of a plate $h^2$, riveted or bolted to the rear Z-iron $d$ of the gate $C'$. In order to secure the bars $i$ and $i'$ from rising by reason of a knock or otherwise, a hook-rod $k$ is fastened to the rear of the Z-iron $d$ of the gate $C'$ by means of staples $k'$ and $k^2$, so as to slide in or out.

The gates C and C' being closed, as shown in Figs. 6 and 7, are opened by raising the jointed lever rods or bars $i$ and $i'$, which, while the gates are closed, lie folded together at the end of the gate $C'$. These bars can easily be raised by taking hold of one of them near the jointed end, and as they are lifted and moved the jointed ends will describe an upward and downward eccentric course, as indicated by the dotted line in Fig. 6. This movement, which separates the bars $i$ and $i'$, will cause the gates to swing open, their final position being that shown in full lines in Fig. 2 and that indicated by dotted lines in Fig. 6. When the gates are open, the bars will be separated, except at their joint, forming, as it were, a continuous bar, as indicated by the dotted lines in Fig. 6. To close the gates requires a reverse movement of the levers $i$ and $i'$, causing them to fold together as before, and in folding the gates are drawn along with them to their former position.

As the invention is applicable to several styles of dumping-cars, some of which may not be provided with exits or outlets for the load at the bottom of what might technically be called a "hopper," I wish it understood that I make use of the word "hopper" in a broad sense simply to thereby designate that part of the car through which the load passes out and in connection with which the gate is applied, and hence I do not use such word in a restricted or technical sense.

It is obvious that changes may be made in the detail of construction and in the arrangement of the parts without departing either from the spirit or substance of my invention, and it is not my intention in this application to claim other than, as stated, the different mechanism shown and described for opening and closing the gates.

Having thus described my invention, what I claim as new, and desire to secure by Letters Patent, is—

1. In combination with a dumping-car, a gate for closing the exit for the load, said gate being suspended by two hangers supporting the edges thereof, said hangers being pivotally secured above said gate and one of them being longer than the other, whereby one edge of said gate may be dropped lower and describe a greater arc than the other during the opening and closing movements.

2. In combination with a dumping-car, a gate for closing the exit for the load, said gate being suspended by two hangers rigidly secured to the edges thereof, one of said hangers being longer than the other and placed at a different angle to the gate, whereby one edge thereof may be dropped lower and describe a greater arc than the other during the opening and closing movements.

SINCLAIR J. JOHNSON.

Witnesses:
E. G. WILKINSON,
M. A. CASSIDY.